(12) United States Patent
Ichiki et al.

(10) Patent No.: US 12,705,713 B2
(45) Date of Patent: Aug. 11, 2026

(54) IMAGE PROCESSOR, IMAGE PROCESSING METHOD, AND PROGRAM

(71) Applicants: Yanmar Holdings Co., Ltd., Osaka (JP); Yanmar Blue Tech Co., Ltd., Osaka (JP)

(72) Inventors: Shoji Ichiki, Tokyo (JP); Katsutoshi Ishiwata, Tokyo (JP)

(73) Assignees: YANMAR HOLDINGS CO., LTD., Osaka (JP); YANMAR BLUE TECH CO., LTD., Osaka (JP)

( * ) Notice: Subject to any disclaimer, the term of this patent is extended or adjusted under 35 U.S.C. 154(b) by 270 days.

(21) Appl. No.: 18/291,314

(22) PCT Filed: Mar. 16, 2022

(86) PCT No.: PCT/JP2022/011861

§ 371 (c)(1),
(2) Date: Jan. 23, 2024

(87) PCT Pub. No.: WO2023/021765

PCT Pub. Date: Feb. 23, 2023

(65) Prior Publication Data

US 2025/0117900 A1 Apr. 10, 2025

(30) Foreign Application Priority Data

Aug. 20, 2021 (JP) ................................ 2021-134585

(51) Int. Cl.
*G06T 5/80* (2024.01)
*G06T 5/50* (2006.01)

(52) U.S. Cl.
CPC .................. *G06T 5/80* (2024.01); *G06T 5/50* (2013.01); *G06T 2207/10028* (2013.01)

(58) Field of Classification Search
CPC ... G06T 5/80; G06T 5/50; G06T 2207/10028; G06T 7/85; G06T 7/521; G06T 7/593; G01B 11/00; G01B 11/245; Y02A 90/30
See application file for complete search history.

(56) References Cited

FOREIGN PATENT DOCUMENTS

| | | | |
|---|---|---|---|
| JP | 2008-236635 | A | 10/2008 |
| JP | 2009-200589 | A | 9/2009 |

(Continued)

OTHER PUBLICATIONS

Massot-Campos M, Oliver-Codina G. Optical Sensors and Methods for Underwater 3D Reconstruction. Sensors (Basel). Dec. 15, 2015;15(12):31525-57. doi: 10.3390/s151229864. PMID: 26694389; PMCID: PMC4721784. (Year: 2015).*

(Continued)

*Primary Examiner* — Delomia L Gilliard
(74) *Attorney, Agent, or Firm* — NORTON ROSE FULBRIGHT US LLP

(57) ABSTRACT

An image processor of the disclosure includes: an image sensor that captures an image of an underwater measurement target; a first laser light source that emits first laser light underwater; a second laser light source that emits second laser light underwater from a position that differs from the first laser light source; and a correction data generation unit that generates, on the basis of first information acquired by causing the image sensor to capture images of the first and second laser light beams at a first water depth and second information acquired by causing the image sensor to capture images of the first and second laser light beams at a second water depth which is a water depth at which the image sensor captures an image of the measurement target, correction data used to correct distortion in a captured image captured by the image sensor at the second water depth.

14 Claims, 16 Drawing Sheets

(56) References Cited

FOREIGN PATENT DOCUMENTS

| | | | |
|---|---|---|---|
| JP | 2011-248414 | A | 12/2011 |
| JP | 2012-018147 | A | 1/2012 |
| JP | 2016-099140 | A | 5/2016 |
| WO | 2017/145202 | A1 | 8/2017 |

OTHER PUBLICATIONS

International Search Report and Written Opinion of PCT Application No. PCT/JP2022/011861, issued on May 24, 2022, 08 pages of ISRWO.

* cited by examiner

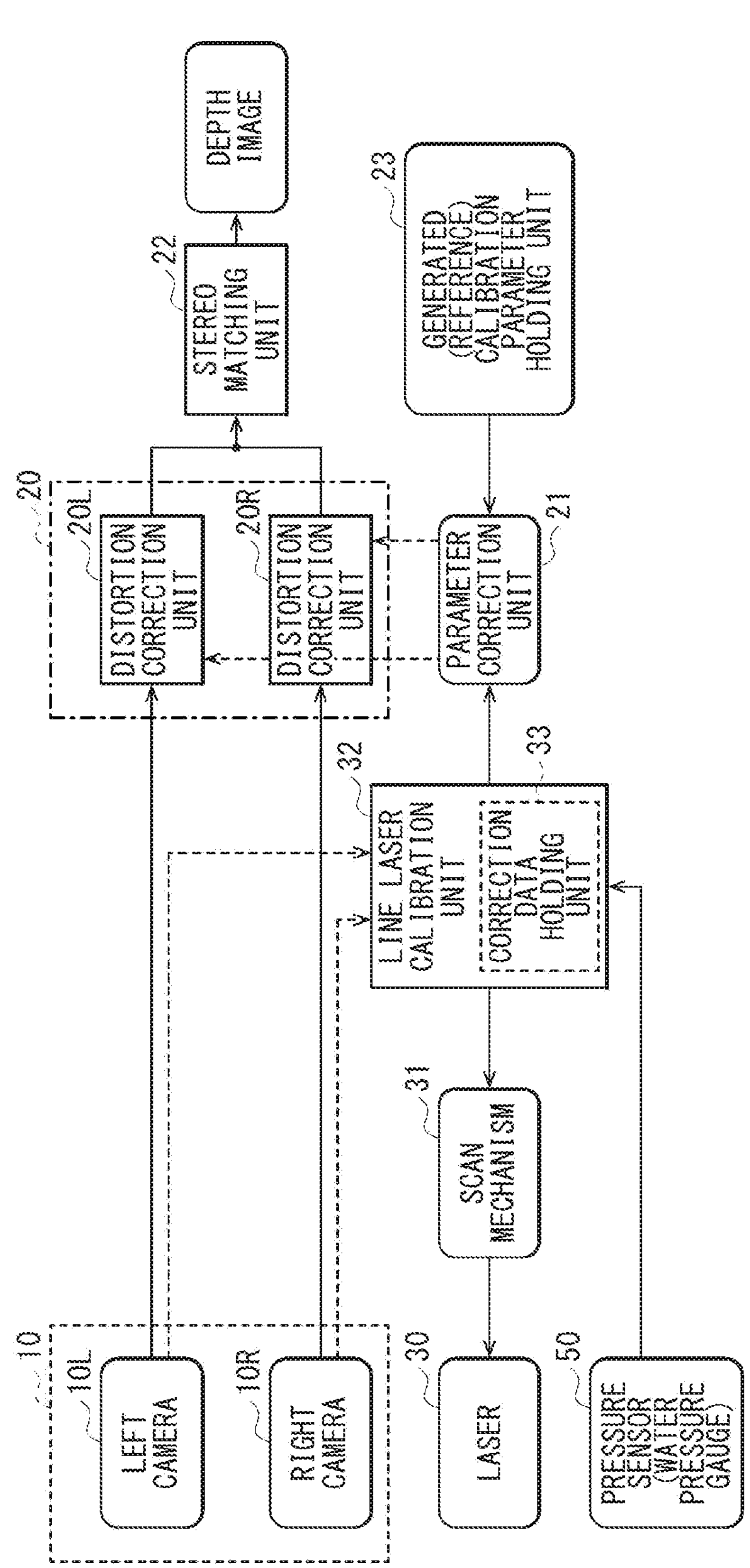
[FIG. 1]
10
10L
LEFT CAMERA
10R
RIGHT CAMERA
30
LASER
50
PRESSURE SENSOR (WATER PRESSURE GAUGE)
31
SCAN MECHANISM
32
LINE LASER CALIBRATION UNIT
33
CORRECTION DATA HOLDING UNIT
21
PARAMETER CORRECTION UNIT
20
20L
DISTORTION CORRECTION UNIT
20R
DISTORTION CORRECTION UNIT
23
GENERATED (REFERENCE) CALIBRATION PARAMETER HOLDING UNIT
22
STEREO MATCHING UNIT
DEPTH IMAGE

[ FIG. 2 ]
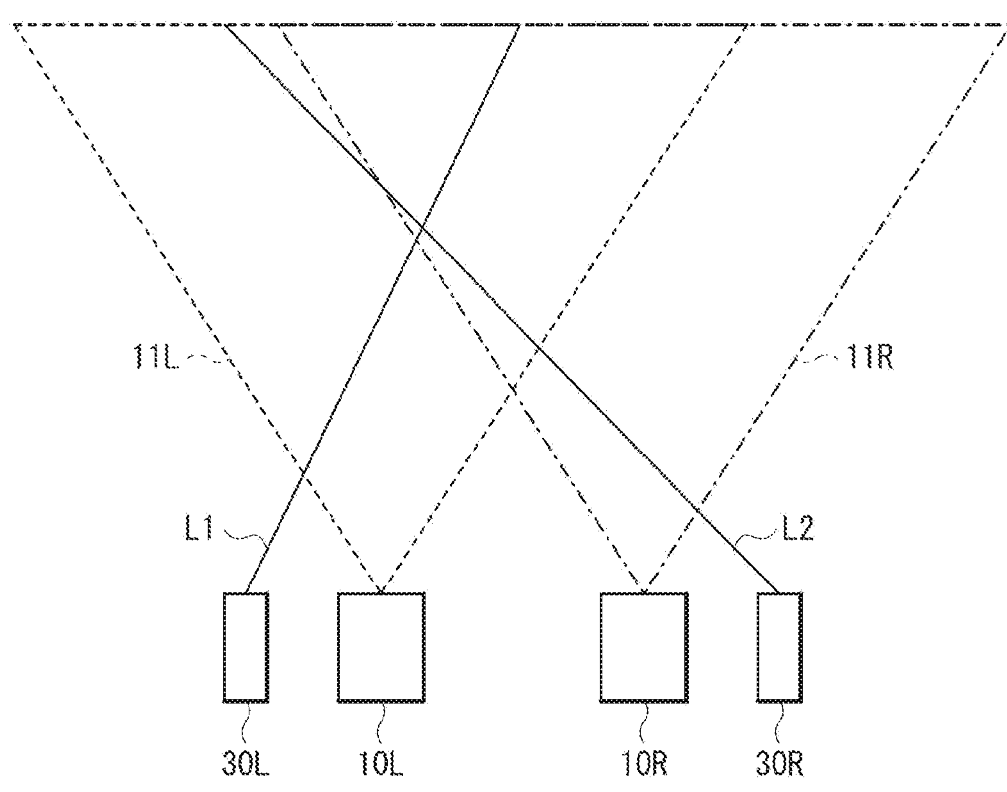

[FIG. 3]
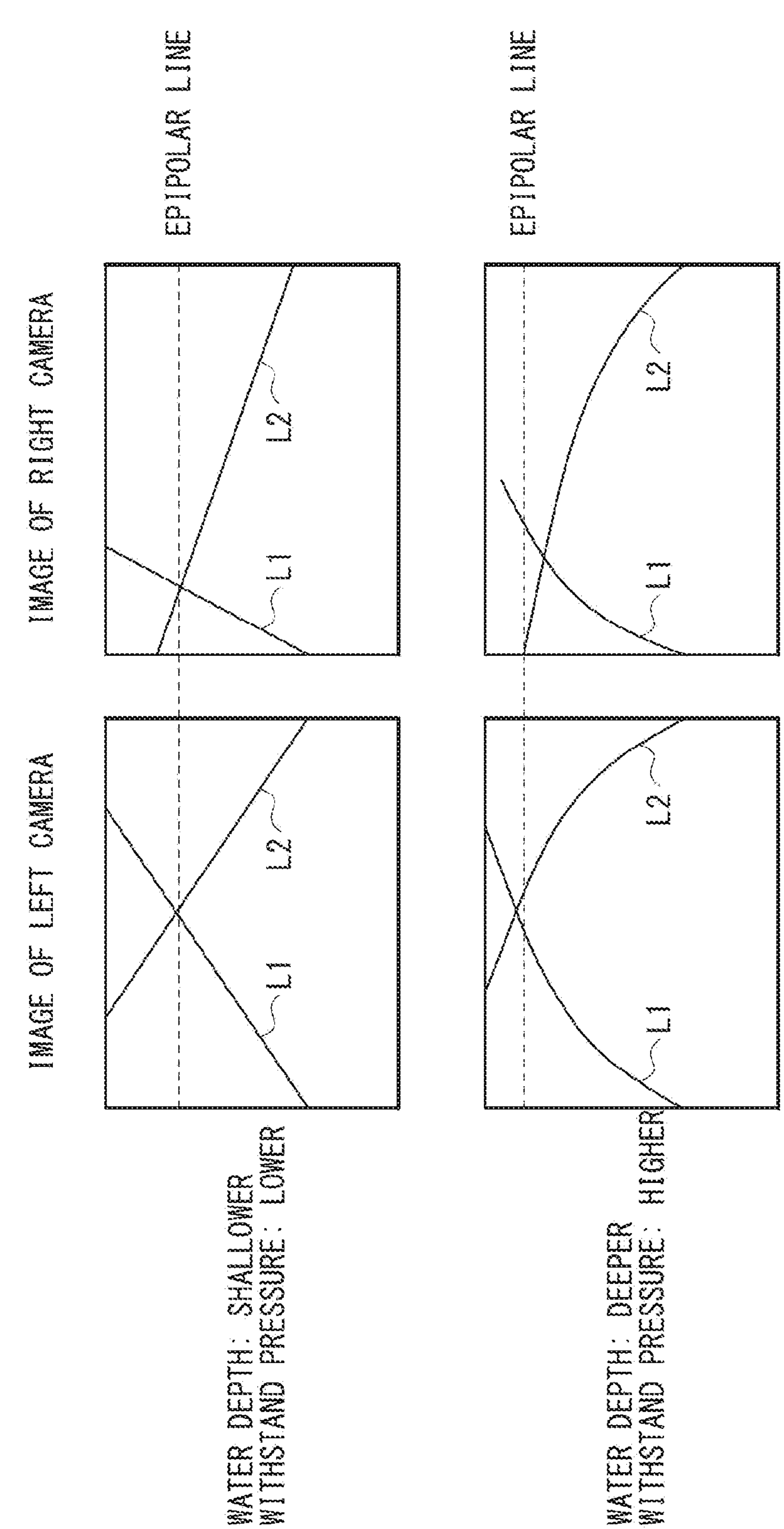

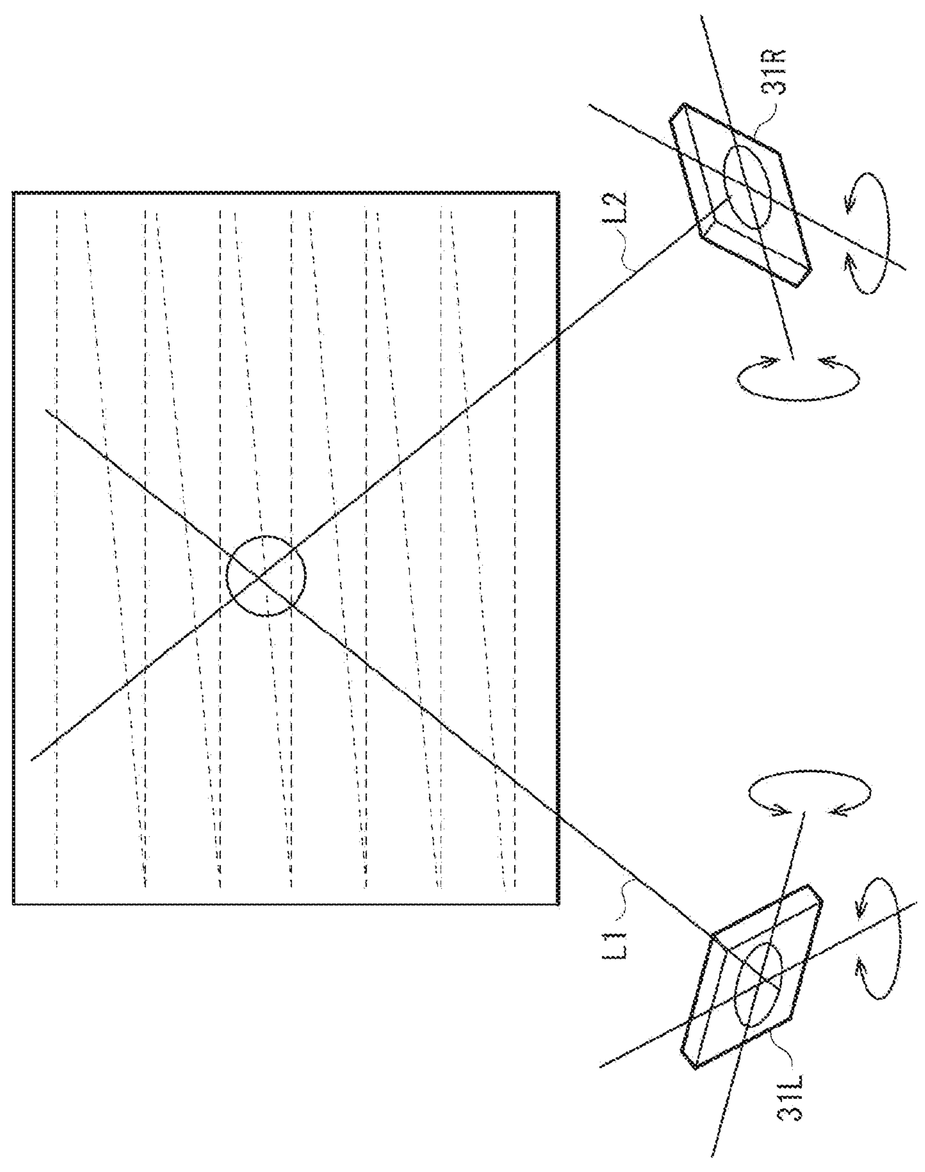
[ FIG. 4 ]

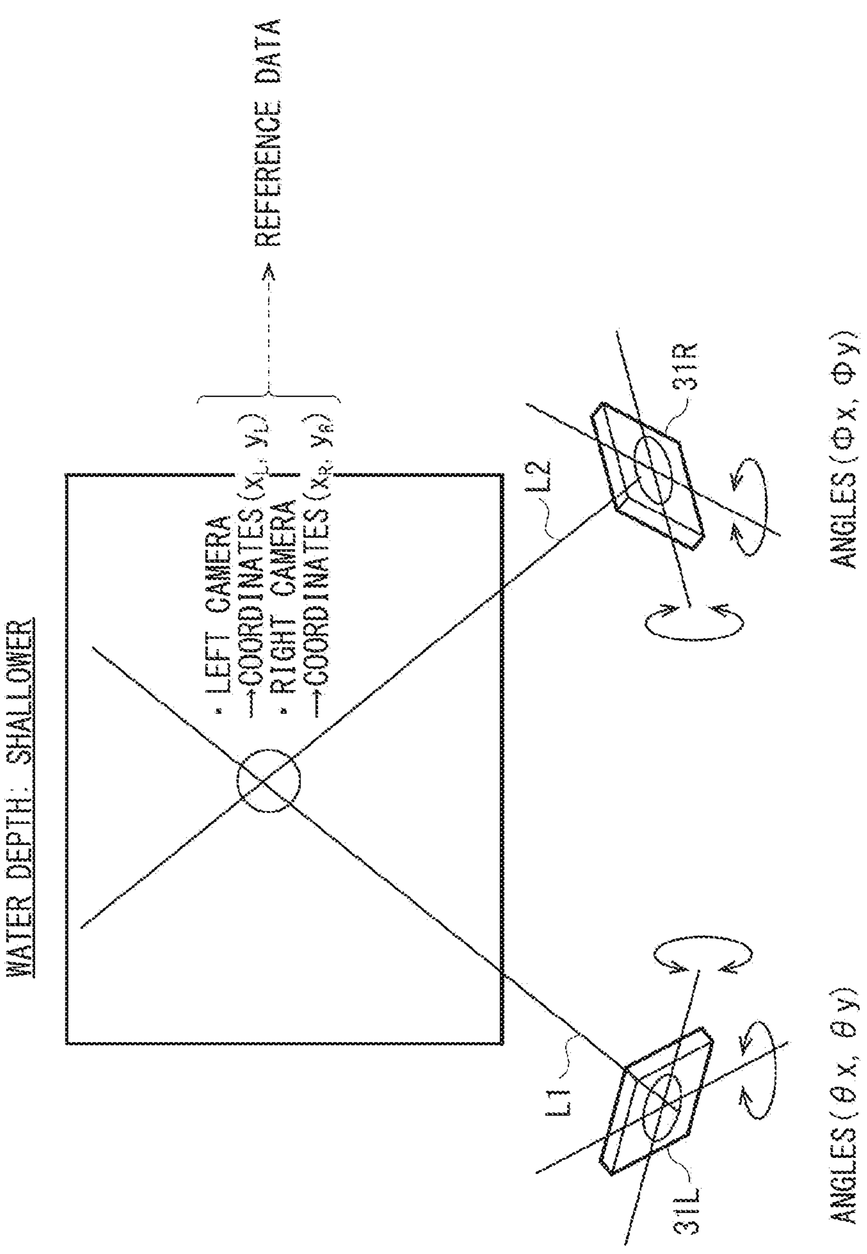
[FIG. 5]

[FIG. 6]
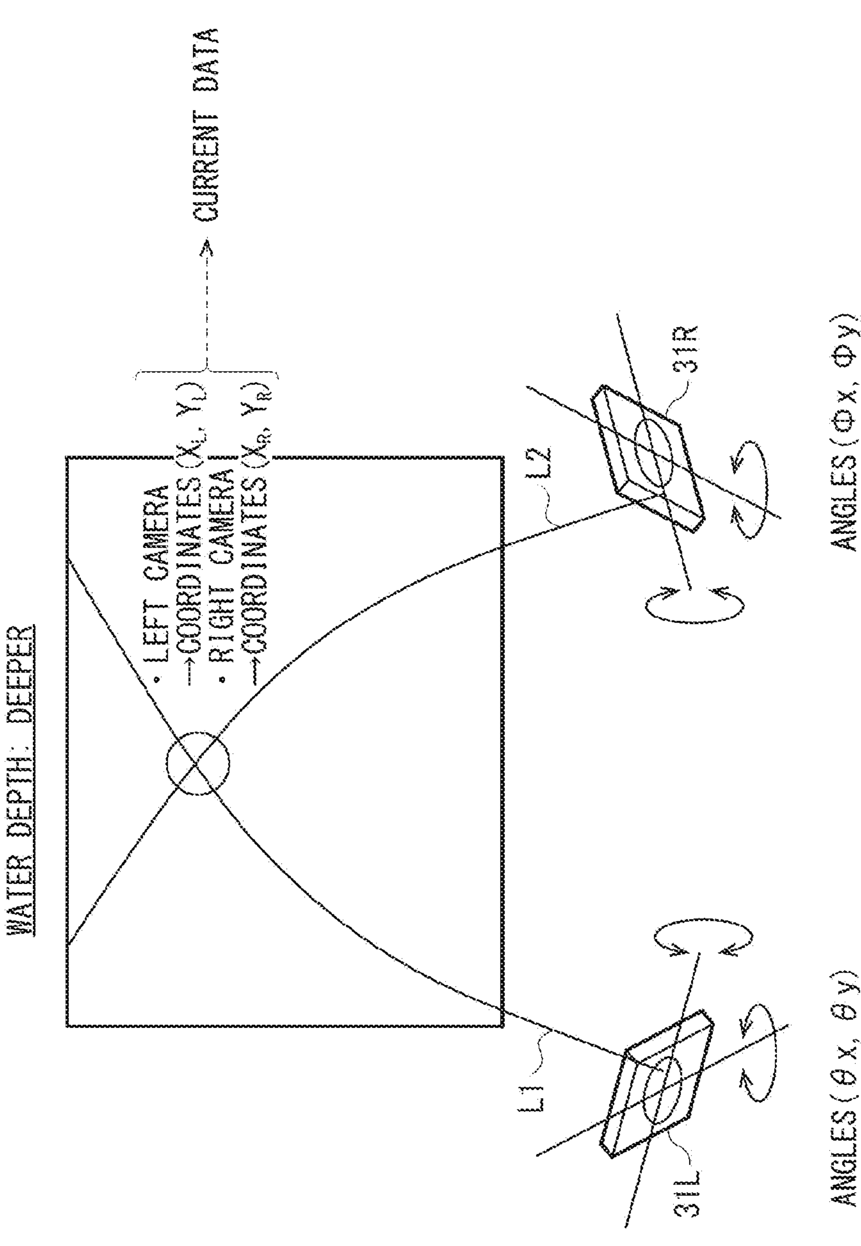

[ FIG. 7 ]

| WATER DEPTH: SHALLOWER COORDINATES OF INTERSECTION POINT (REFERENCE DATA) | SCAN MECHANISM ANGLES | WATER DEPTH: DEEPER COORDINATES OF INTERSECTION POINT (CURRENT DATA) | AMOUNT OF MOVEMENT |
|---|---|---|---|
| ・・・ | ・・・ | ・・・ | ・・・ |
| $(x_L, y_L)$ | $(\theta x, \theta y)$ $(\Phi x, \Phi y)$ | $(X_L, Y_L)$ | $(X_L - x_L, Y_L - y_L)$ |
| $(x_R, y_R)$ | $(\theta x, \theta y)$ $(\Phi x, \Phi y)$ | $(X_R, Y_R)$ | $(X_R - x_R, Y_R - y_R)$ |
| ・・・ | ・・・ | ・・・ | ・・・ |

[ FIG. 8 ]
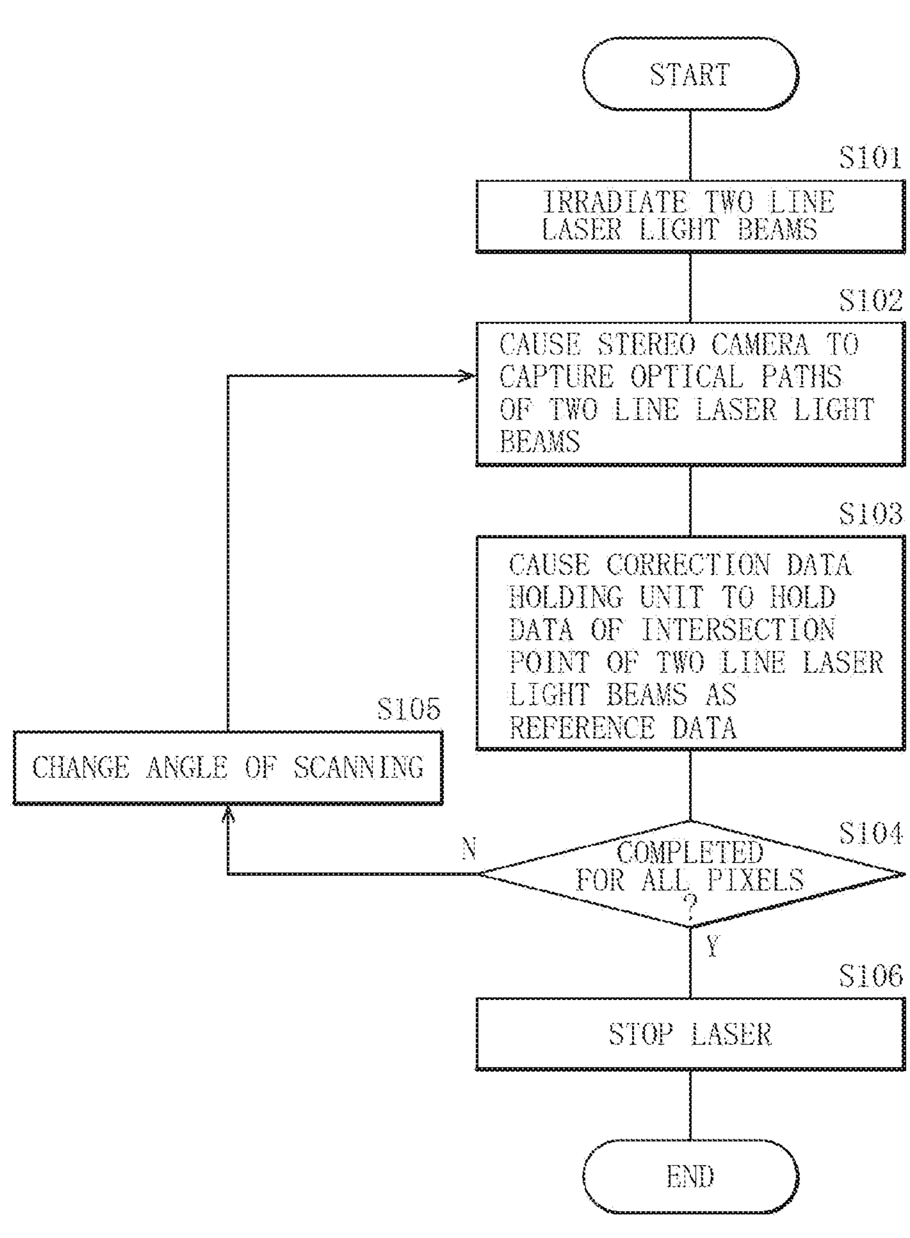

[ FIG. 9 ]
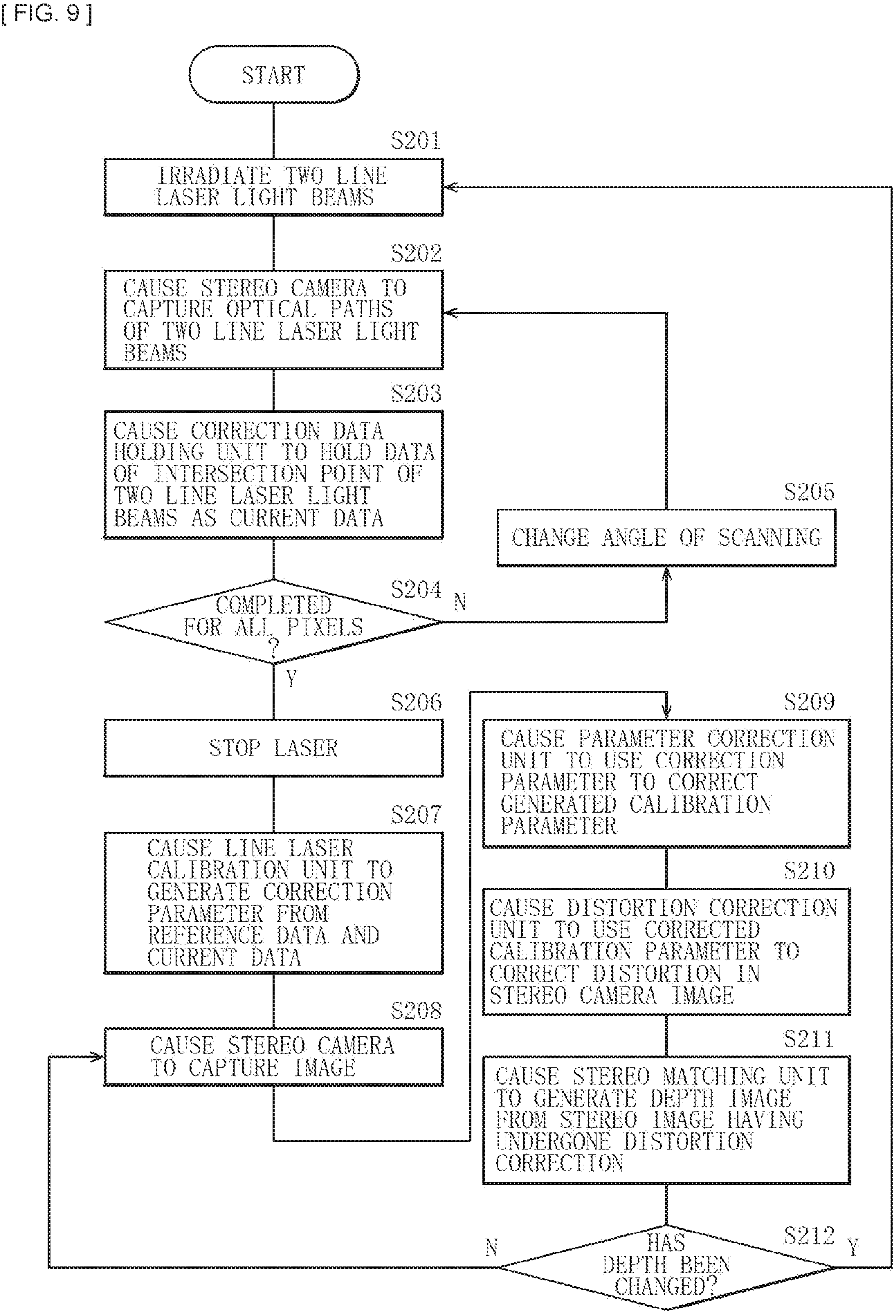

[FIG. 10]

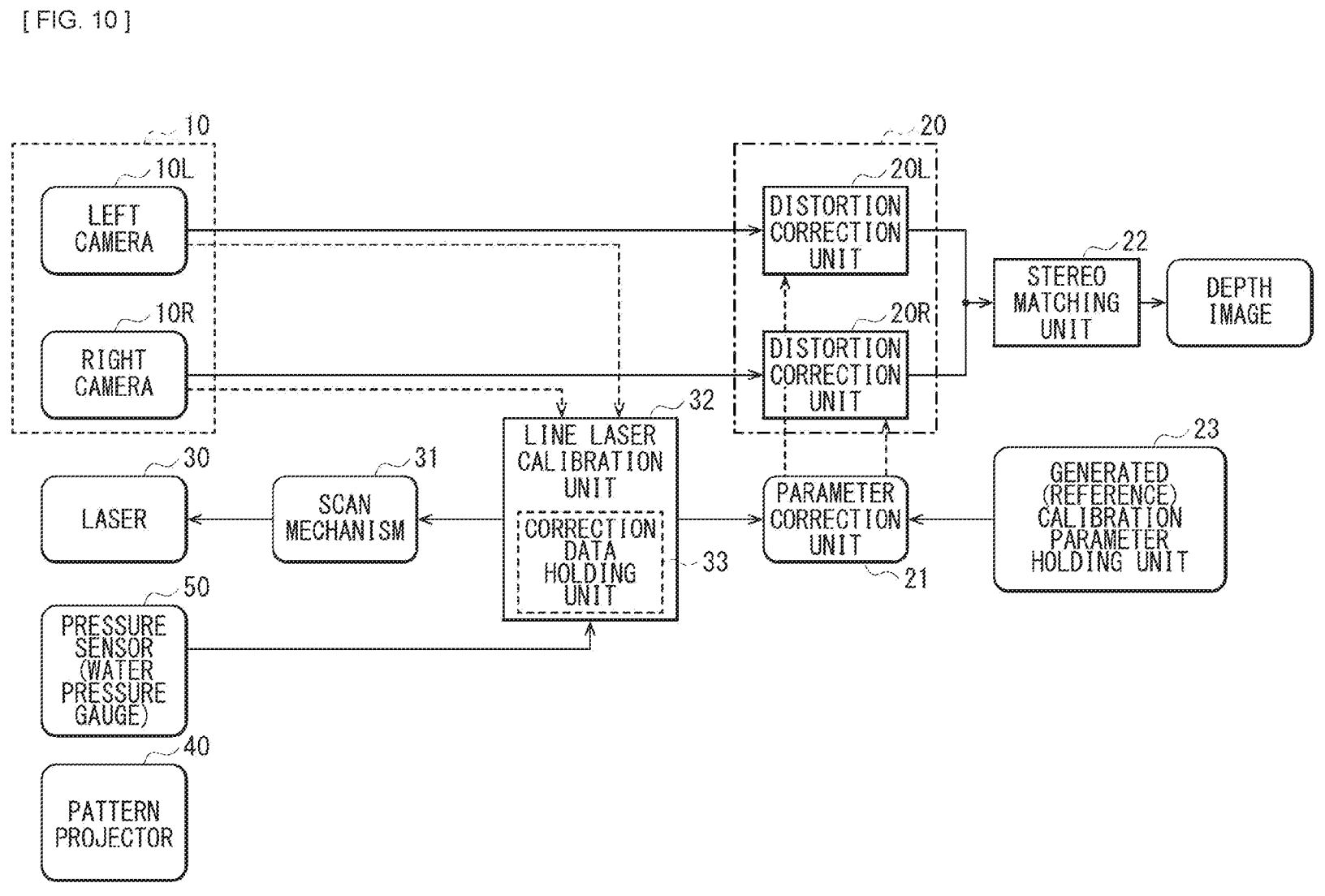

10
10L LEFT CAMERA
10R RIGHT CAMERA
30 LASER
50 PRESSURE SENSOR (WATER PRESSURE GAUGE)
40 PATTERN PROJECTOR
31 SCAN MECHANISM
32 LINE LASER CALIBRATION UNIT
33 CORRECTION DATA HOLDING UNIT
20
20L DISTORTION CORRECTION UNIT
20R DISTORTION CORRECTION UNIT
21 PARAMETER CORRECTION UNIT
22 STEREO MATCHING UNIT
DEPTH IMAGE
23 GENERATED (REFERENCE) CALIBRATION PARAMETER HOLDING UNIT

[FIG. 11]
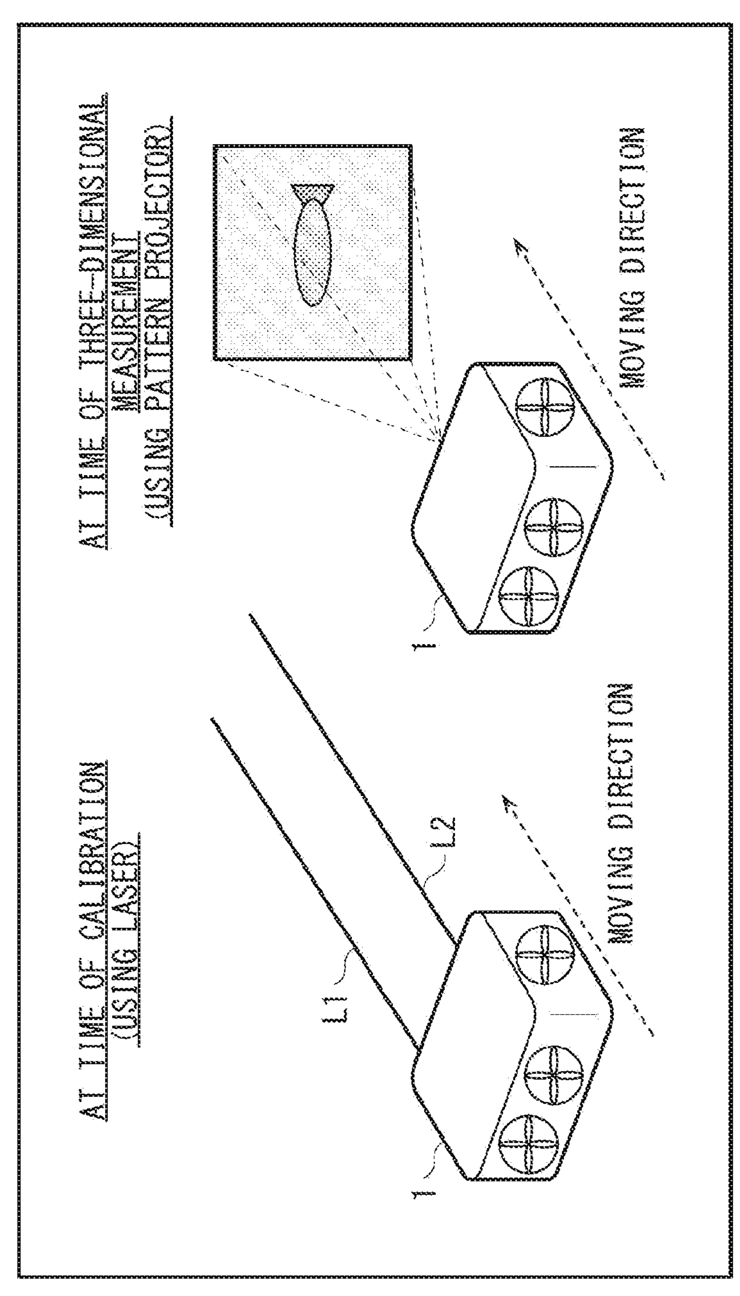

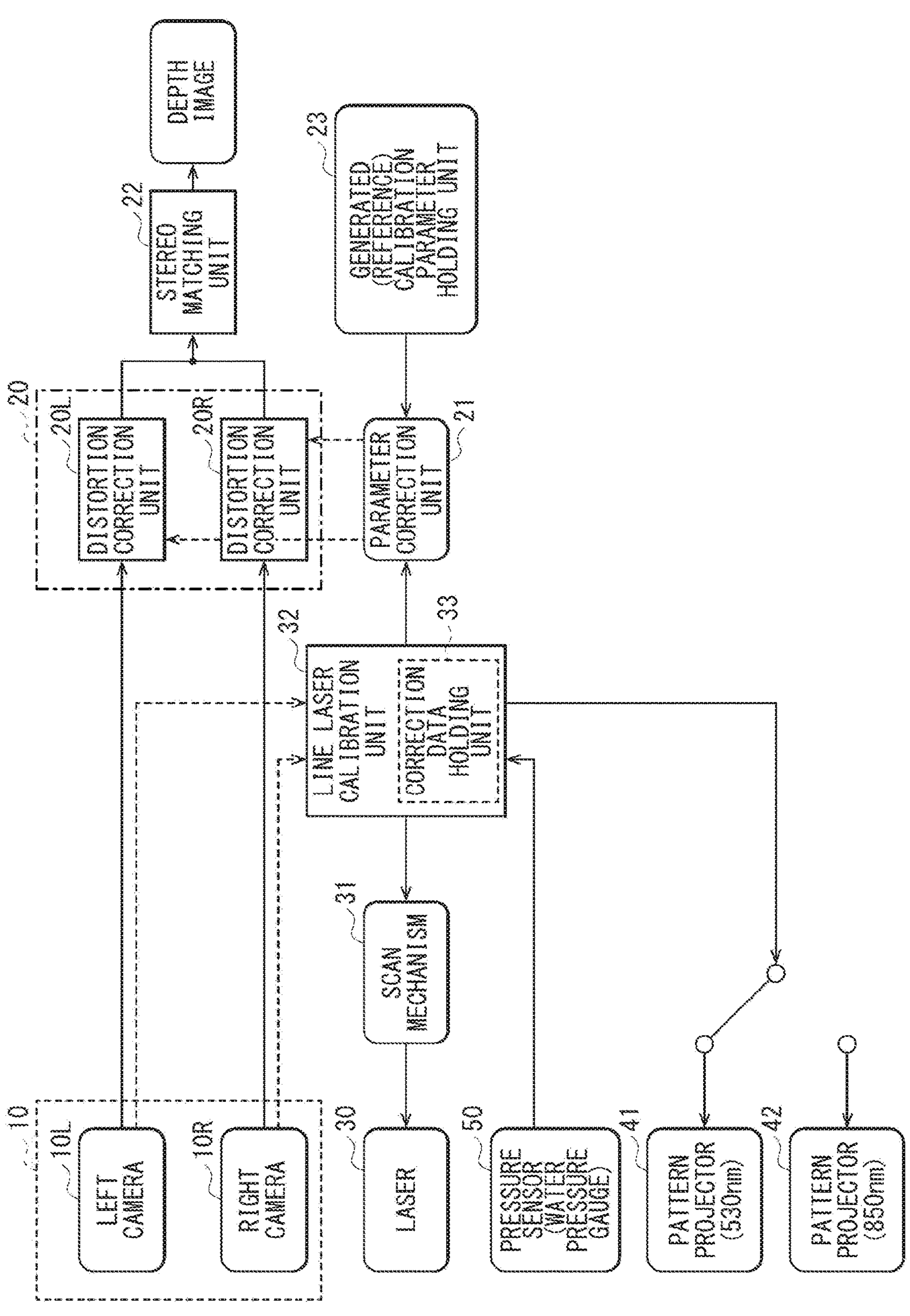
[FIG. 12]
10
10L
LEFT CAMERA
10R
RIGHT CAMERA
30
LASER
50
PRESSURE SENSOR (WATER PRESSURE GAUGE)
41
PATTERN PROJECTOR (530nm)
42
PATTERN PROJECTOR (850nm)
31
SCAN MECHANISM
32
LINE LASER CALIBRATION UNIT
33
CORRECTION DATA HOLDING UNIT
20
20L
DISTORTION CORRECTION UNIT
20R
DISTORTION CORRECTION UNIT
21
PARAMETER CORRECTION UNIT
22
STEREO MATCHING UNIT
DEPTH IMAGE
23
GENERATED (REFERENCE) CALIBRATION PARAMETER HOLDING UNIT

[ FIG. 13 ]

| DEPTH | WATER DEPTH: SHALLOWER COORDINATES OF INTERSECTION POINT (REFERENCE DATA) | SCAN MECHANISM ANGLES | WATER DEPTH: DEEPER COORDINATES OF INTERSECTION POINT (CURRENT DATA) | AMOUNT OF MOVEMENT |
|---|---|---|---|---|
| . . . | . . . | . . . | . . . | . . . |
| 40m | $(x_L, y_L)$ | $(\theta x, \theta y)$ $(\Phi x, \Phi y)$ | $(X_L, Y_L)$ | $(X_L-x_L, Y_L-y_L)$ |
| 40m | $(x_R, y_R)$ | $(\theta x, \theta y)$ $(\Phi x, \Phi y)$ | $(X_R, Y_R)$ | $(X_R-x_R, Y_R-y_R)$ |
| . . . | . . . | . . . | . . . | . . . |

[FIG. 14]
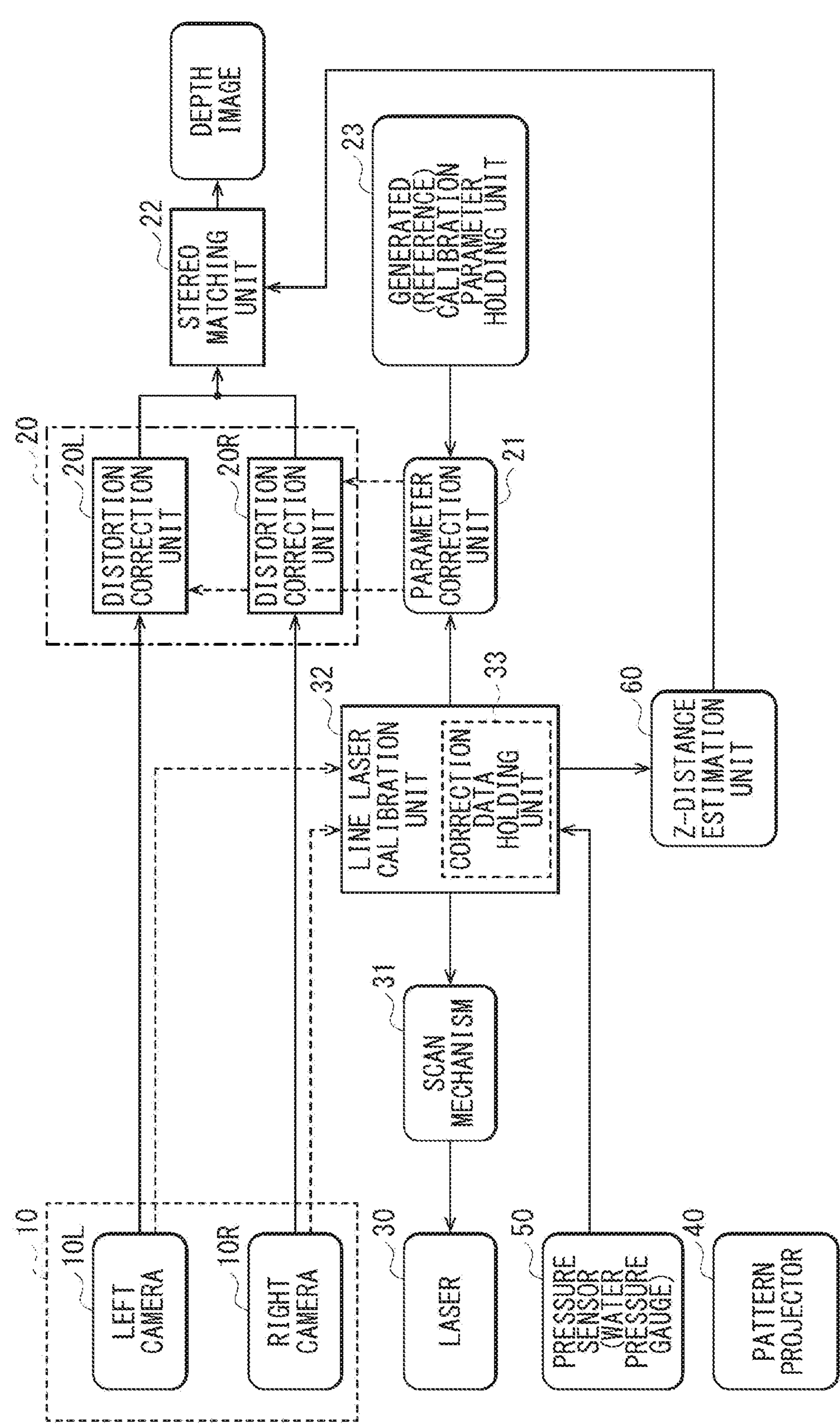

[ FIG. 15 ]
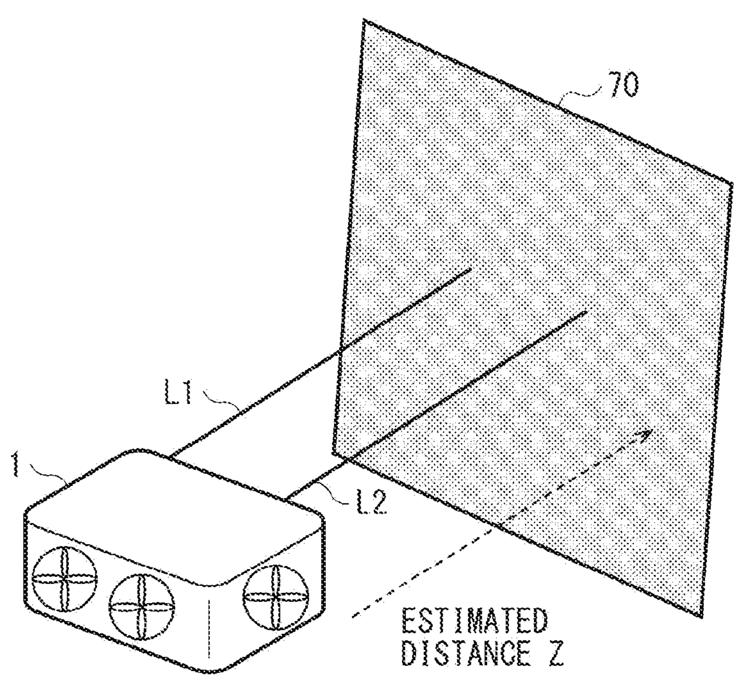

[ FIG. 16 ]
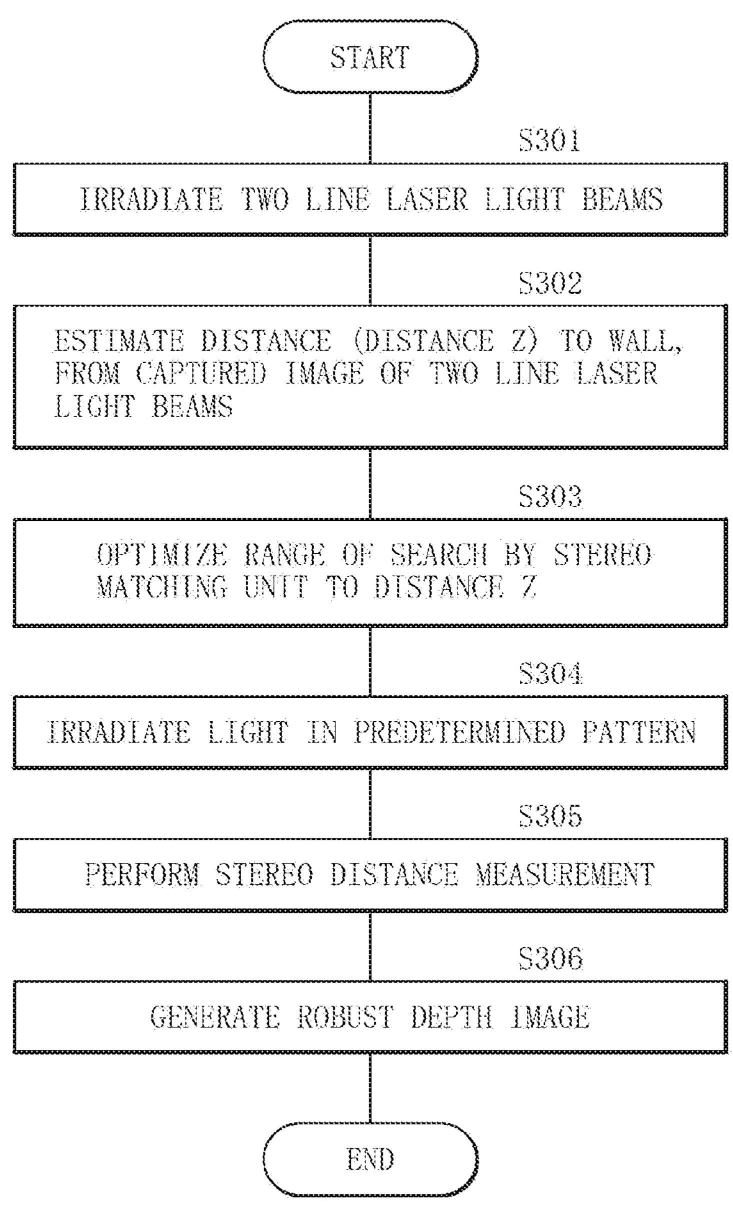

IMAGE PROCESSOR, IMAGE PROCESSING METHOD, AND PROGRAM

CROSS REFERENCE TO RELATED APPLICATIONS

This application is a U.S. National Phase of International Patent Application No. PCT/JP2022/011861 filed on Mar. 16, 2022, which claims priority benefit of Japanese Patent Application No. JP 2021-134585 filed in the Japan Patent Office on Aug. 20, 2021. Each of the above-referenced applications is hereby incorporated herein by reference in its entirety.

TECHNICAL FIELD

The present disclosure relates to an image processor and an image processing method.

BACKGROUND ART

In an autonomous underwater robot (or autonomous underwater vehicle or AUV), for example, there has been a demand for a technique of performing three-dimensional measurement underwater using a stereo camera. However, as a water depth increases, withstand pressure applied to a robot or a camera housing increases, and a captured image is more distorted, making it difficult to correctly perform three-dimensional measurement. PTL 1 proposes a method of using corrected data acquired in advance to calibrate a captured image.

CITATION LIST

Patent Literature

PTL 1: Japanese Unexamined Patent Application Publication No. 2011-248414

SUMMARY OF THE INVENTION

In the method of using corrected data acquired in advance to calibrate a captured image, there may be a possibility that a cause-and-effect relationship between withstand pressure assumed in advance and withstand pressure that actually occurs in a case where three-dimensional measurement is performed is not correct, making it difficult to correctly correct distortion in a captured image.

It is desirable to provide an image processor, an image processing method, and a program that make it possible to correctly correct distortion in a captured image in accordance with a water depth.

An image processor according to an embodiment of the present disclosure includes: an image sensor that captures an image of an underwater measurement target; a first laser light source that emits first laser light underwater; a second laser light source that emits second laser light underwater from a position that differs from the first laser light source; and a correction data generation unit that generates, on the basis of first information acquired by causing the image sensor to capture images of the first laser light and the second laser light at a first water depth and second information acquired by causing the image sensor to capture images of the first laser light and the second laser light at a second water depth which is a water depth at which the image sensor captures an image of the measurement target, correction data used to correct distortion in a captured image captured by the image sensor at the second water depth.

An image processing method according to an embodiment of the present disclosure includes: causing an image sensor to capture an image of an underwater measurement target; emitting first laser light underwater; emitting second laser light underwater from a position that differs from a first laser light source; and generating, on the basis of first information acquired by causing the image sensor to capture images of the first laser light and the second laser light at a first water depth and second information acquired by causing the image sensor to capture images of the first laser light and the second laser light at a second water depth which is a water depth at which the image sensor captures an image of the measurement target, correction data used to correct distortion in a captured image captured by the image sensor at the second water depth.

A program according to an embodiment of the present disclosure causes a computer to execute processing, the processing including: emitting first laser light underwater; emitting second laser light underwater from a position that differs from a position at which a first laser light source emits the light; and generating, on the basis of first information acquired by causing an image sensor to capture images of the first laser light and the second laser light at a first water depth and second information acquired by causing the image sensor to capture images of the first laser light and the second laser light at a second water depth which is a water depth at which the image sensor captures an image of a measurement target, correction data used to correct distortion in a captured image captured by the image sensor at the second water depth.

In the image processor, the image processing method, or the program according to the embodiments of the present disclosure, correction data used to correct distortion in a captured image captured by the image sensor at the second water depth is generated, on the basis of first information acquired by causing the image sensor to capture images of the first laser light and the second laser light at a first water depth and second information acquired by causing the image sensor to capture images of the first laser light and the second laser light at a second water depth which is a water depth at which the image sensor captures an image of the measurement target.

BRIEF DESCRIPTION OF DRAWING

FIG. 1 is a block diagram schematically illustrating a configuration example of an image processor according to a first embodiment of the present disclosure.

FIG. 2 is an explanatory diagram illustrating an example of a state where a laser irradiates two line laser light beams and a visual field range of a stereo camera.

FIG. 3 is an explanatory diagram illustrating an example of captured images of two line laser light beams by the stereo camera.

FIG. 4 is an explanatory diagram illustrating an example of scanning of two line laser light beams, which is performed by a scan mechanism.

FIG. 5 is an explanatory diagram illustrating an example of an intersection point of two line laser light beams in a case where a water depth is shallower.

FIG. 6 is an explanatory diagram illustrating an example of an intersection point of two line laser light beams in a case where water depth is deeper.

FIG. 7 is an explanatory diagram illustrating an example of information held in a correction data holding unit in the image processor according to the first embodiment.

FIG. 8 is a flowchart illustrating an example of processing of creating reference data, which is performed in a case where a water depth is shallower, in the image processor according to the first embodiment.

FIG. 9 is a flowchart illustrating an example of processing of calibration, which is performed in a case where a water depth is deeper, in the image processor according to the first embodiment.

FIG. 10 is a block diagram schematically illustrating a configuration example of an image processor according to a second embodiment.

FIG. 11 is a configuration diagram schematically illustrating a configuration example of an autonomous underwater robot to which the image processor according to the second embodiment is applied.

FIG. 12 is a block diagram schematically illustrating a configuration example of an image processor according to a third embodiment.

FIG. 13 is an explanatory diagram illustrating an example of information held in a correction data holding unit in an image processor according to a fourth embodiment.

FIG. 14 is a block diagram schematically illustrating a configuration example of an image processor according to a fifth embodiment.

FIG. 15 is a configuration diagram schematically illustrating a configuration example of an autonomous underwater robot to which the image processor according to the fifth embodiment is applied.

FIG. 16 is a flowchart illustrating an example of processing of generating a depth image, in the image processor according to the fifth embodiment.

MODES FOR CARRYING OUT THE INVENTION

In the following, some embodiments of the present disclosure will be described in detail with reference to the drawings. It is to be noted that the description will be given in the following order.

0. Comparative Example
1. First Embodiment (FIGS. 1 to 9)
   1.1 Configuration
   1.2 Operation
   1.3 Effects
2. Second Embodiment (FIGS. 10 to 11)
3. Third Embodiment (FIG. 12)
4. Fourth Embodiment (FIG. 13)
5. Fifth Embodiment (FIGS. 14 to 16)
6. Other embodiments

0. Comparative Example

It has been demanded such a technique of performing three-dimensional measurement undersea for performing inspection and for achieving autonomous movement of an autonomous underwater robot, for example. It has been demanded, for performing inspection, in particular, a technique of high resolution, highly accurate three-dimensional measurement. As a technique of achieving high resolution and high accuracy, a more probable idea is a stereo camera style that is used for on-the-ground purposes in many cases. However, as a water depth increases, withstand pressure applied to a robot or a camera housing increases, and a captured image is more distorted, making it difficult to correctly perform three-dimensional measurement.

PTL 1 (Japanese Unexamined Patent Application Publication No. 2011-248414) proposes, as an image processing system that makes it possible to acquire an image equivalent to an image captured in a normal pressure environment, a method of acquiring in advance corrected data under each withstand pressure. However, since calibration is performed in advance, there may be a possibility that a cause-and-effect relationship between withstand pressure assumed in advance and withstand pressure that actually occurs is not correct. In the technique proposed in PTL 1, correction information under each pressure is acquired in advance, and a difference parameter (a motion vector) in a normal pressure environment is calculated beforehand. However, such information depends on accuracy of a pressure sensor and a temperature sensor used for environment measurement. In addition, there may be a possibility that a change in mechanical shape, which occurs as such a sensor is actually submerged in a high pressure environment, does not correspond to a parameter acquired in advance. Therefore, it may not be possible to perform correct three-dimensional measurement.

1. First Embodiment

1.1 Configuration

FIG. 1 schematically illustrates a configuration example of an image processor according to a first embodiment of the present disclosure.

For example, the image processor according to the first embodiment is mounted on an autonomous underwater robot, and is used for performing three-dimensional measurement underwater such as undersea.

The image processor according to the first embodiment includes a stereo camera 10, a distortion correction unit 20, a parameter correction unit 21, a stereo matching unit 22, and a generated calibration parameter holding unit 23. The image processor according to the first embodiment further includes a laser 30, a scan mechanism 31, a line laser calibration unit 32, and a pressure sensor 50.

The stereo matching unit 22 corresponds to a specific example of a "depth image generation unit" in the technique of the present disclosure. The line laser calibration unit 32 corresponds to a specific example of a "correction data generation unit" in the technique of the present disclosure.

The distortion correction unit 20, the parameter correction unit 21, the stereo matching unit 22, and the line laser calibration unit 32 may be configured in a computer including, for example, one or a plurality of central processing units (CPUs), one or a plurality of read only memories (ROMs), and one or a plurality of random access memories (RAMs). In this case, processing performed by each of the distortion correction unit 20, the parameter correction unit 21, the stereo matching unit 22, and the line laser calibration unit 32 may be achieved as the one or the plurality of CPUs execute(s) processing based on a program stored in each of the one or the plurality of ROMs or RAMs. Furthermore, processing performed by each of the distortion correction unit 20, the parameter correction unit 21, the stereo matching unit 22, and the line laser calibration unit 32 may be achieved as the one or the plurality of CPUs execute(s) processing based on a program externally supplied via a wired or wireless network, for example.

FIG. 2 illustrates an example of a state where the laser 30 respectively irradiate two line laser light beams L1 and L2 and a visual field range of the stereo camera 10.

The stereo camera 10 is an image sensor that captures an image of an underwater measurement target. The stereo camera 10 includes, as illustrated in FIG. 2, a left camera 10L and a right camera 10R. FIG. 2 illustrates an example of a visual field range 11L of the left camera 10L and a visual field range 11R of the right camera 10R.

The generated calibration parameter holding unit 23 holds a generated calibration parameter generated in advance on the ground to serve as a reference for calibration, for example.

The parameter correction unit 21 corrects, on the basis of correction data (a correction parameter) generated by the line laser calibration unit 32, the calibration parameter (the generated calibration parameter) used to correct distortion in a captured image captured by the stereo camera 10.

The distortion correction unit 20 includes a distortion correction unit 20L for the left camera and a distortion correction unit 20R for the right camera. The distortion correction unit 20 corrects, on the basis of the corrected calibration parameter corrected by the parameter correction unit 21, distortion in a captured image of a measurement target, which is captured by the stereo camera 10.

The stereo matching unit 22 corresponds to a depth image generation unit that generates a depth image on the basis of the captured image of the measurement target, which is corrected by the distortion correction unit 20. The stereo matching unit 22 performs stereo matching processing on a captured image captured by the left camera 10L, which has undergone distortion correction, and is thus corrected by the distortion correction unit 20L, and a captured image captured by the right camera 10R, which has undergone distortion correction, and is thus corrected by the distortion correction unit 20R, to generate a depth image including information regarding three-dimensional measurement.

The laser 30 includes, as illustrated in FIG. 2, a left laser 30L and a right laser 30R. The left laser 30L serves as a first laser light source that emits the line laser light L1 as first laser light underwater. The right laser 30R serves as a second laser light source that emits the line laser light L2 as second laser light underwater from a position that differs from a position at which the left laser 30L emits the light. FIG. 2 illustrates an example of a light path of the line laser light L1 emitted from the left laser 30L and a light path of the line laser light L2 emitted from the right laser 30R.

The left laser 30L is disposed on a left side of the left camera 10L, for example. The right laser 30R is disposed on a right side of the right camera 10R, for example. Note that the number of the laser 30 is not limited to two. To improve a processing speed for calibration, for example, other two lasers may further be installed in upper and lower directions, in addition to the left laser 30L and the right laser 30R.

The scan mechanism 31 includes, as illustrated in FIGS. 4 to 6 described later, a left scan mirror 31L and a right scan mirror 31R. The left scan mirror 31L serves as a first scan mechanism that scans the line laser light L1 emitted from the left laser 30L. The right scan mirror 31R serves as a second scan mechanism that scans the line laser light L2 emitted from the right laser 30R. The left scan mirror 31L and the right scan mirror 31R respectively may be micro electro mechanical systems (MEMS) mirrors, for example.

The line laser calibration unit 32 includes a correction data holding unit 33. Note that the correction data holding unit 33 may be provided outside the line laser calibration unit 32.

As laser light is irradiated undersea, backscattering light occurs due to plankton, for example. Observing this backscattering light with the stereo camera 10 makes it possible to make visible a light path of laser light. As the scan mechanism 31 controls scanning of the two line laser light beams L1 and L2, the line laser calibration unit 32 acquires information regarding an intersection point of the two line laser light beams L1 and L2 for each of all pixels in the stereo camera 10. The line laser calibration unit 32 holds, as reference data, information regarding an intersection point of the two line laser light beams L1 and L2, which is seen from the stereo camera 10 at a position where a water depth is shallower (a first water depth) in advance. In the image processor according to the first embodiment, this reference data and information regarding an intersection point of the two line laser light beams L1 and L2, which is acquired in a state (a second water depth) where higher withstand pressure is applied than that at the first water depth, are compared with each other, and an amount of distortion in a captured image captured by the stereo camera 10 is calculated to perform distortion correction on the image.

The line laser calibration unit 32 generates, on the basis of first information acquired by causing the stereo camera 10 to capture images of the line laser light L1 and the line laser light L2 at the first water depth (a shallower water depth) and second information acquired by causing the stereo camera 10 to capture images of the line laser light L1 and the line laser light L2 at the second water depth (a deeper water depth) which is a water depth at which the stereo camera 10 captures an image of a measurement target, correction data (a correction parameter) used to correct distortion in a captured image captured by the stereo camera 10 at the second water depth.

The line laser calibration unit 32 acquires, as first information, information regarding a first intersection point of the line laser light L1 and the line laser light L2, which is captured in an image by the stereo camera 10 at the first water depth, acquires, as second information, information regarding a second intersection point corresponding to the first intersection point of the line laser light L1 and the line laser light L2, which is captured in an image by the stereo camera 10 at the second water depth, and generates correction data (a correction parameter) on the basis of information regarding an amount of movement between the first intersection point and the second intersection point on the captured images captured by the stereo camera 10.

The line laser calibration unit 32 controls scanning performed by the left scan mirror 31L and the right scan mirror 31R to acquire information regarding the first intersection point and information regarding the second intersection point in each of all pixels on the captured images captured by the stereo camera 10.

The correction data holding unit 33 holds pieces of information of the information regarding the first intersection point and the information regarding the second intersection point in association, respectively, with information regarding a first angle of scanning performed by the left scan mirror 31L and information regarding a second angle of scanning performed by the right scan mirror 31R.

The pressure sensor 50 serves as a water pressure gauge that measures pressure underwater, and is able to estimate a depth.

FIG. 3 illustrates an example of captured images of the two line laser light beams L1 and L2 by the stereo camera 10.

An upper row in FIG. 3 illustrates a case where a water depth is shallower, that is, a case where a calibration parameter coincides with a generated calibration parameter serving as a reference. Intersection points of the two line laser light beams L1 and L2 thus lie on an epipolar line.

Therefore, the distortion correction unit 20 is able to correctly perform distortion correction. A lower row in FIG. 3 illustrates a case where a water depth is deeper. An image is thus distorted due to negative effects of high withstand pressure applied to the apparatus mounted with the image processor. In this case, intersection points of the two line laser light beams L1 and L2 do not lie on an epipolar line. Therefore, if a generated calibration parameter serving as a reference is used as is, no correct correction image is created in the distortion correction unit 20, and no correct result is acquired in a distance image (a depth image) computed by the stereo matching unit 22.

FIG. 4 illustrates an example of scanning of the two line laser light beams L1 and L2, which is performed by the scan mechanism 31.

FIG. 4 illustrates an example of scanning of the two line laser light beams L1 and L2 using the scan mechanism 31 to make it possible to capture an image of an intersection point of the two line laser light beams L1 and L2 in each of all pixels in the left camera 10L, as an example. The example in FIG. 4 illustrates that the line laser light L1 that lies on a left side is scanned. At a position where a water depth is shallower (the first water depth), the correction data holding unit 33 is caused to store an angle of scanning at each of all positions of the pixels, and, as the water depth changes (to the second water depth), one of the intersection points and one of the stored positions of the pixels, which correspond to those at an identical angle of scanning, are compared with each other. It is thus possible to acquire an amount of movement of the intersection point due to the water depth.

FIG. 5 illustrates an example of an intersection point of the two line laser light beams L1 and L2 in a case where a water depth is shallower (the first water depth). FIG. 6 illustrates an example of an intersection point of the two line laser light beams L1 and L2 in a case where a water depth is deeper (the second water depth). FIG. 7 illustrates an example of information held in the correction data holding unit 33.

It is assumed in here that, as illustrated in FIG. 5, an intersection point of the two line laser light beams L1 and L2 in a case where a water depth is shallower lies at a coordinate ($x_L$, $y_L$) on a captured image captured by the left camera 10L and a coordinate ($x_R$, $y_R$) on a captured image captured by the right camera 10R, and angles of the left scan mirror 31L are (θx, θy) and angles of the right scan mirror 31R are (Φx, Φy) at that time. Furthermore, it is assumed in here that, as illustrated in FIG. 6, an intersection point of the two line laser light beams L1 and L2 lies at a coordinate ($X_L$, $Y_L$) on a captured image captured by the left camera 10L and a coordinate ($X_R$, $Y_R$) on a captured image captured by the right camera 10R in a case where angles in the scan mechanism 31 are respectively set to (θx, θy) and (Φx, Φy), identically to the case illustrated in FIG. 5, in a case where a water depth is deeper. The line laser calibration unit 32 calculates, as information regarding amounts of movement of the coordinates, an amount of movement ($X_L-X_L$, $Y_L-y_L$) for the left camera 10L and an amount of movement ($X_R-X_R$, $Y_R-y_R$) for the right camera 10R, performs similar processing on coordinates of all pixels on the captured images by the stereo camera 10, and causes the correction data holding unit 33 to hold the acquired information (FIG. 7) as correction data (a correction parameter).

1.2 Operation

In a case where calibration is to be performed in accordance with withstand pressure in the image processor according to the first embodiment, the line laser calibration unit 32 controls the scan mechanism 31, causes the two line laser light beams L1 and L2 to be outputted, uses a captured image acquired from the stereo camera 10, performs line laser calibration, and uses the method described above to acquire a correction parameter. The parameter correction unit 21 and the distortion correction unit 20 perform distortion correction on the captured image acquired from the stereo camera 10 on the basis of the captured image acquired from the stereo camera 10, the generated calibration parameter serving as the reference for calibration, which is generated in advance, and the correction parameter described above. The stereo matching unit 22 performs stereo matching from the captured image having undergone the distortion correction to generate a depth image. The line laser calibration may not be performed per frame of an image captured by the stereo camera 10, but may be performed periodically each time water pressure fluctuates or the apparatus such as a robot mounted with the image processor is lowered.

FIG. 8 is a flowchart illustrating an example of processing of creating reference data, which is performed in a case where a water depth is shallower, in the image processor according to the first embodiment.

The laser 30 and the scan mechanism 31 first irradiate the two line laser light beams L1 and L2 (step S101). Next, light paths of the two line laser light beams L1 and L2 are captured into an image by the stereo camera 10 (step S102). Next, the line laser calibration unit 32 causes the correction data holding unit 33 to hold data of an intersection point of the two line laser light beams L1 and L2 as reference data (step S103).

Next, the line laser calibration unit 32 determines whether or not scanning for all the pixels in the stereo camera 10 has been completed (step S104). In a case where it is determined that scanning for all the pixels has not yet been completed (step S104; N), the line laser calibration unit 32 then changes an angle of the scanning performed by the scan mechanism 31 (step S105), and causes the processing to return to step S102.

In a case where it is determined that scanning for all the pixels has been completed (step S104; Y), on the other hand, the line laser calibration unit 32 causes the laser 30 to stop (step S106).

FIG. 9 is a flowchart illustrating an example of processing of calibration, which is performed in a case where a water depth is deeper, in the image processor according to the first embodiment.

The laser 30 and the scan mechanism 31 first irradiate the two line laser light beams L1 and L2 (step S201). Next, light paths of the two line laser light beams L1 and L2 are captured into an image by the stereo camera 10 (step S202). Next, the line laser calibration unit 32 causes the correction data holding unit 33 to hold data of an intersection point of the two line laser light beams L1 and L2 as current data (step S203).

Next, the line laser calibration unit 32 determines whether or not scanning for all the pixels in the stereo camera 10 has been completed (step S204). In a case where it is determined that scanning for all the pixels has not yet been completed (step S204; N), the line laser calibration unit 32 then changes an angle of the scanning performed by the scan mechanism 31 (step S205), and causes the processing to return to step S202.

In a case where it is determined that scanning for all the pixels has been completed (step S204; Y), on the other hand, the line laser calibration unit 32 causes the laser 30 to stop (step S206). Next, the line laser calibration unit 32 generates a correction parameter from the reference data and the current data that are held in the correction data holding unit 33 (step S207). Next, the stereo camera 10 is caused to capture a captured image of a measurement target (step S208). Next, the parameter correction unit 21 uses the correction parameter to correct the generated calibration parameter (step S209). Next, the distortion correction unit 20 uses the corrected calibration parameter to correct distortion in the captured image (a stereo camera image) by the stereo camera 10 (step S210). Next, the stereo matching unit 22 generates a depth image from the stereo image having undergone the distortion correction (step S211).

Next, the line laser calibration unit 32 determines whether or not a depth has been changed on the basis of information provided from the pressure sensor 50 (step S212). In a case where the line laser calibration unit 32 has determined that the depth has not yet been changed (step S212; N), the processing returns to step S208. In a case where the line laser calibration unit 32 has determined that the depth has been changed (step S212; Y), on the other hand, the processing returns to step S201.

1.3 Effects

With the image processor according to the first embodiment, it is possible to correctly correct distortion in a captured image in accordance with a water depth, as described above.

The image processor according to the first embodiment measures a change in distortion in a captured image in a real time manner, and provides feedback to the distortion correction unit 20, making it possible to constantly perform three-dimensional measurement using a correctly corrected image. At that time, it is possible to easily perform calibration on a captured image at a portion to which three-dimensional measurement is to be performed. Even if distortion that actually occurs differs from that measured beforehand, making it possible to perform calibration at that time (in a real time manner) makes it possible to perform correct correction.

The image processor according to the first embodiment makes it possible to perform calibration on a captured image on the basis of actual data even under a plurality of types of withstand pressure, making it possible to correctly correct an image, and making it possible to finally calculate a correct depth image through stereo matching. In a case where a stereo camera style is applied as a technique of high resolution, highly accurate three-dimensional measurement undersea, it is possible to address an issue of a distance measurement error due to image distortion that occurs due to negative effects of withstand pressure by using the laser 30 and the scan mechanism 31 to perform calibration, making it possible to easily perform correct correction in a real time manner.

Note that the effects described in the specification are mere examples. The effects of the technique are not limited to the effects described in the specification. There may be any other effects than those described herein. The same applies to the effects of other embodiments described below.

2. Second Embodiment

Next, an image processor and an image processing method according to a second embodiment of the present disclosure will now be described herein. It is to be noted that like reference numerals designate, through the drawings, substantially identical or corresponding components in the image processor and the image processing method according to the first embodiment described above. Some descriptions are thus appropriately omitted.

FIG. 10 schematically illustrates a configuration example of the image processor according to the second embodiment. FIG. 11 schematically illustrates a configuration example of an autonomous underwater robot 1 to which the image processor according to the second embodiment is applied.

The image processor according to the second embodiment has a configuration where a pattern projector 40 is added in the configuration of the image processor according to the first embodiment described above (FIG. 1).

The pattern projector 40 irradiates a measurement target with a predetermined pattern (on a right side in FIG. 11). Thereby, projecting a form of texture that is preferable for stereo matching onto even a measurement target having no form of texture, which is not preferable for stereo matching, makes it possible to correctly perform three-dimensional measurement. Note that, in a case where calibration is to be performed, as illustrated on a left side in FIG. 11, the laser 30 is used, similar to the image processor according to the first embodiment described above.

Others may be substantially similar in configuration, operation, and effect to the image processor and the image processing method according to the first embodiment described above.

3. Third Embodiment

Next, an image processor and an image processing method according to a third embodiment of the present disclosure will now be described herein. It is to be noted that like reference numerals designate, through the drawings, substantially identical or corresponding components in the image processor and the image processing method according to the first or second embodiment described above. Some descriptions are thus appropriately omitted.

FIG. 12 schematically illustrates a configuration example of the image processor according to the third embodiment.

The image processor according to the third embodiment has a configuration where two pattern projectors 41 and 42 are added in the configuration of the image processor according to the first embodiment described above (FIG. 1). The two pattern projectors 41 and 42 are able to irradiate a measurement target with predetermined patterns within wavelength ranges that differ from each other. For example, the pattern projector 41 may be able to irradiate a predetermined pattern within a range of 530 nm. The pattern projector 42 may be able to irradiate a predetermined pattern within a range of 850 nm.

Note that such a configuration may be applied that includes three or more pattern projectors and is able to irradiate three or more predetermined patterns within wavelength ranges that differ from each other.

The line laser calibration unit 32 presumes underwater turbidity on the basis of a captured image of the line laser light L1 and the line laser light L2 captured by the stereo camera 10 in a state where withstand pressure is applied (at the second water depth), and selects, on the basis of the presumed underwater turbidity, one of the two pattern projectors 41 and 42 as a pattern projector that irradiates a predetermined pattern.

The image processor according to the third embodiment utilizes a phenomenon that, as a wavelength of light becomes closer to that of blue (a range of 440 nm), a rate of absorption underwater becomes lower and a distance at which the light reaches becomes longer, and a fact that an amount of backscattering light differs depending on a wavelength of light in an environment where underwater turbidity is higher (a near infrared range is narrower than a visible range). A distance at which light reaches in a case where the two line laser light beams L1 and L2 are irradiated is presumed by the line laser calibration unit 32 from an image captured by the stereo camera 10, and underwater turbidity is further presumed. It is possible to perform switching between the pattern projector 41 that uses the range of 530 nm where a rate of absorption underwater is lower in a case where turbidity is lower and the pattern projector 42 that uses the range of 850 nm where backscattering light is reduced in a case where turbidity is higher where backscattering light increases to make a pattern unclear if the range of 530 nm is used, and use either the pattern projector, making it possible to perform highly robust three-dimensional measurement.

Others may be substantially similar in configuration, operation, and effect to the image processor and the image processing method according to the first embodiment described above.

4. Fourth Embodiment

Next, an image processor and an image processing method according to a fourth embodiment of the present disclosure will now be described herein. It is to be noted that like reference numerals designate, through the drawings, substantially identical or corresponding components in the image processor and the image processing method according to any one of the first to third embodiments described above. Some descriptions are thus appropriately omitted.

FIG. 13 illustrates an example of information held in a correction data holding unit 33 in the image processor according to the fourth embodiment.

A basic configuration of the image processor according to the fourth embodiment may be substantially similar to the configuration of the image processor according to the third embodiment (FIG. 12). However, in the image processor according to the fourth embodiment, depth (water depth) information is held as information that the correction data holding unit 33 holds, as illustrated in FIG. 13, in addition to the information illustrated in FIG. 7. The correction data holding unit 33 holds correction data (a correction parameter) generated by the line laser calibration unit 32 in association with depth information regarding the second water depth (a deep water depth).

If line laser calibration is to be performed each time a depth changes, there are negative effects to an operation time of the apparatus such as a robot mounted with the image processor. Therefore, for a depth (a water depth) at which line laser calibration has been performed once, no further line laser calibration may be performed. The correction data holding unit 33 holds a correction parameter in conjunction with the depth information presumed from the pressure sensor 50. For a depth (a water depth) at which line laser calibration has been performed once, distortion in a captured image may be corrected on the basis of the correction parameter held in the correction data holding unit 33.

Others may be substantially similar in configuration, operation, and effect to the image processor and the image processing method according to the first embodiment or the fourth embodiment described above.

5. Fifth Embodiment

Next, an image processor and an image processing method according to a fifth embodiment of the present disclosure will now be described herein. It is to be noted that like reference numerals designate, through the drawings, substantially identical or corresponding components in the image processor and the image processing method according to any one of the first to fourth embodiments described above. Some descriptions are thus appropriately omitted.

FIG. 14 schematically illustrates a configuration example of the image processor according to the fifth embodiment. FIG. 15 schematically illustrates a configuration example of the autonomous underwater robot 1 to which the image processor according to the fifth embodiment is applied.

The image processor according to the fifth embodiment has a configuration where the pattern projector 40 and a Z-distance estimation unit 60 are added in the configuration of the image processor according to the first embodiment described above (FIG. 1).

The Z-distance estimation unit 60 estimates a distance Z to a measurement target on the basis of a captured image of the line laser light L1 and the line laser light L2, which is captured by the stereo camera 10 in the state where withstand pressure is applied (at the second water depth). The stereo matching unit 22 sets, on the basis of the distance Z estimated by the Z-distance estimation unit 60, a range of search for the measurement target for generating a depth image.

The image processor according to the fifth embodiment is suitable in a case where a distance to a planar object such as a wall 70 of a dam is to be measured, as illustrated in FIG. 15. Irradiating the two line laser light beams L1 and L2 to the wall 70 and causing the stereo camera 10 to capture an image makes it possible to estimate, through triangulation, the distance Z to the wall 70 on the basis of a plurality of points irradiated with the two line laser light beams L1 and L2 irradiated to the wall 70. In stereo distance measurement using block matching, a range within which it is possible to perform distance measurement is generally limited due to a reason of a limited memory resource and a reason of achieving high-speed operation. Further limiting a range of search by the stereo matching unit 22 by using the estimated distance to the wall 70 then makes it possible to achieve a further resource reduction and more prompt operation. Furthermore, as one advantage of limiting a range of search by the stereo matching unit 22, it is possible to expect improved robustness including prevention of an error in estimating a distance due to erroneous matching.

FIG. 16 is a flowchart illustrating an example of processing of generating a depth image, in the image processor according to the fifth embodiment.

The laser 30 and the scan mechanism 31 first irradiate the two line laser light beams L1 and L2 (step S301). Next, the Z-distance estimation unit 60 estimates a distance Z to the wall 70, from a captured image of the two line laser light beams L1 and L2 (step S302). Next, the range of search by the stereo matching unit 22 is optimized to the distance Z (step S303).

Next, the pattern projector 40 irradiates light in a predetermined pattern to the wall 70 (step S304). Next, the stereo matching unit 22 performs stereo distance measurement (step S305). Next, the stereo matching unit 22 generates a robust depth image (step S306).

Others may be substantially similar in configuration, operation, and effect to the image processor and the image processing method according to the first embodiment or the second embodiment described above.

6. Other Embodiments

The technique of the present disclosure is not limited to the embodiments described above. It is possible to modify and implement the technique of the present disclosure in a wide variety of ways.

For example, the present technique may have the following configurations.

According to the present technique having configurations described below, it is generated, on the basis of first information acquired by causing the image sensor to capture images of the first laser light and the second laser light at the first water depth and second information acquired by causing the image sensor to capture images of the first laser light and the second laser light at the second water depth which is a water depth at which the image sensor captures an image of a measurement target, correction data used to correct distortion in a captured image captured by the image sensor at the second water depth. Thereby, it is possible to correctly correct distortion in a captured image in accordance with a water depth.

(1)

An image processor including:

an image sensor that captures an image of an underwater measurement target;

a first laser light source that emits first laser light underwater;

a second laser light source that emits second laser light underwater from a position that differs from the first laser light source; and a correction data generation unit that generates, on the basis of first information acquired by causing the image sensor to capture images of the first laser light and the second laser light at a first water depth and second information acquired by causing the image sensor to capture images of the first laser light and the second laser light at a second water depth which is a water depth at which the image sensor captures an image of the measurement target, correction data used to correct distortion in a captured image captured by the image sensor at the second water depth.

(2)

The image processor according to (1), further including a parameter correction unit that corrects, on the basis of the correction data generated by the correction data generation unit, a calibration parameter used to correct distortion in the captured image captured by the image sensor.

(3)

The image processor according to (2), further including a distortion correction unit that corrects, on the basis of the calibration parameter corrected by the parameter correction unit, distortion in the captured image of the measurement target, the captured image being captured by the image sensor.

(4)

The image processor according to (3), further including a depth image generation unit that generates a depth image on the basis of the captured image of the measurement target, the captured image being corrected by the distortion correction unit.

(5)

The image processor according to (4), further including a distance estimation unit that estimates a distance to the measurement target on the basis of the captured images of the first laser light and the second laser light, the captured images being captured by the image sensor at the second water depth, in which the depth image generation unit sets, on the basis of the distance estimated by the distance estimation unit, a range of search for the measurement target for generating the depth image.

(6)

The image processor according to any one of (1) to (5), in which the correction data generation unit acquires, as the first information, information regarding a first intersection point of the first laser light and the second laser light of which the images are captured by the image sensor at the first water depth, the correction data generation unit acquires, as the second information, information regarding a second intersection point corresponding to the first intersection point of the first laser light and the second laser light of which the images are captured by the image sensor at the second water depth, and the correction data generation unit generates the correction data on the basis of information regarding an amount of movement between the first intersection point and the second intersection point on the captured images captured by the image sensor.

(7)

The image processor according to (6), further including:

a first scan mechanism that scans the first laser light emitted from the first laser light source; and a second scan mechanism that scans the second laser light emitted from the second laser light source, in which the correction data generation unit controls the scanning performed by the first scan mechanism and the second scan mechanism to acquire the information regarding the first intersection point and the information regarding the second intersection point in each of all pixels on the captured images captured by the image sensor.

(8)

The image processor according to (7), further including a correction data holding unit that holds pieces of information of the information regarding the first intersection point and the information regarding the second intersection point in association, respectively, with information regarding a first angle of scanning performed by the first scan mechanism and information regarding a second angle of scanning performed by the second scan mechanism.

(9)

The image processor according to (8), in which the correction data holding unit holds the correction data in association with depth information regarding the second water depth.

(10)

The image processor according to any one of (1) to (9), further including a pattern projector that irradiates the measurement target with a predetermined pattern.

(11)

The image processor according to any one of (1) to (10), further including a plurality of pattern projectors that irradiates the measurement target with respective predetermined patterns with wavelength ranges that differ from each other.

(12)

The image processor according to (11), in which the correction data generation unit presumes underwater turbidity on the basis of the captured images of the first laser light and the second laser light, the captured images being captured by the image sensor at the second water depth, and selects, on the basis of the presumed underwater turbidity, one of the plurality of pattern projectors as a pattern projector that irradiates the predetermined pattern.

(13)

An image processing method including:

causing an image sensor to capture an image of an underwater measurement target;

emitting first laser light underwater;

emitting second laser light underwater from a position that differs from the first laser light source; and generating, on the basis of first information acquired by causing the image sensor to capture images of the first laser light and the second laser light at a first water depth and second information acquired by causing the image sensor to capture images of the first laser light and the second laser light at a second water depth which is a water depth at which the image sensor captures an image of the measurement target, correction data used to correct distortion in a captured image captured by the image sensor at the second water depth.

(14)

A program that causes a computer to execute processing, the processing including:

emitting first laser light underwater;

emitting second laser light underwater from a position that differs from the first laser light source; and generating, on the basis of first information acquired by causing an image sensor to capture images of the first laser light and the second laser light at a first water depth and second information acquired by causing the image sensor to capture images of the first laser light and the second laser light at a second water depth which is a water depth at which the image sensor captures an image of a measurement target, correction data used to correct distortion in a captured image captured by the image sensor at the second water depth.

The present application claims the benefit of Japanese Priority Patent Application JP 2021-134585 filed with the Japan Patent Office on Aug. 20, 2021, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An image processor comprising:

an image sensor that captures an image of an underwater measurement target;

a first laser light source that emits first laser light underwater;

a second laser light source that emits second laser light underwater from a position that differs from the first laser light source; and a correction data generation unit that generates, on a basis of first information acquired by causing the image sensor to capture images of the first laser light and the second laser light at a first water depth and second information acquired by causing the image sensor to capture images of the first laser light and the second laser light at a second water depth which is a water depth at which the image sensor captures an image of the measurement target, correction data used to correct distortion in a captured image captured by the image sensor at the second water depth.

2. The image processor according to claim 1, further comprising a parameter correction unit that corrects, on a basis of the correction data generated by the correction data generation unit, a calibration parameter used to correct distortion in the captured image captured by the image sensor.

3. The image processor according to claim 2, further comprising a distortion correction unit that corrects, on a basis of the calibration parameter corrected by the parameter correction unit, distortion in a captured image of the measurement target, the captured image being captured by the image sensor.

4. The image processor according to claim 3, further comprising a depth image generation unit that generates a depth image on a basis of the captured image of the measurement target, the captured image being corrected by the distortion correction unit.

5. The image processor according to claim 4, further comprising a distance estimation unit that estimates a distance to the measurement target on a basis of captured images of the first laser light and the second laser light, the captured images being captured by the image sensor at the second water depth, wherein the depth image generation unit sets, on a basis of the distance estimated by the distance estimation unit, a range of search for the measurement target for generating the depth image.

6. The image processor according to claim 1, wherein the correction data generation unit acquires, as the first information, information regarding a first intersection point of the first laser light and the second laser light of which the images are captured by the image sensor at the first water depth, the correction data generation unit acquires, as the second information, information regarding a second intersection point corresponding to the first intersection point of the first laser light and the second laser light of which the images are captured by the image sensor at the second water depth, and the correction data generation unit generates the correction data on a basis of information regarding an amount of movement between the first intersection point and the second intersection point on the captured images captured by the image sensor.

7. The image processor according to claim 6, further comprising:

a first scan mechanism that scans the first laser light emitted from the first laser light source; and a second scan mechanism that scans the second laser light emitted from the second laser light source, wherein the correction data generation unit controls the scanning performed by the first scan mechanism and the second scan mechanism to acquire the information regarding the first intersection point and the information regarding the second intersection point in each of all pixels on the captured images captured by the image sensor.

8. The image processor according to claim 7, further comprising a correction data holding unit that holds pieces of information of the information regarding the first intersection point and the information regarding the second intersection point in association, respectively, with information regarding a first angle of scanning performed by the first scan mechanism and information regarding a second angle of scanning performed by the second scan mechanism.

9. The image processor according to claim 8, wherein the correction data holding unit holds the correction data in association with depth information regarding the second water depth.

10. The image processor according to claim 1, further comprising a pattern projector that irradiates the measurement target with a predetermined pattern.

11. The image processor according to claim 1, further comprising a plurality of pattern projectors that irradiates the measurement target with respective predetermined patterns with wavelength ranges that differ from each other.

12. The image processor according to claim 11, wherein the correction data generation unit presumes underwater turbidity on a basis of the captured images of the first laser light and the second laser light, the captured images being captured by the image sensor at the second water depth, and selects, on a basis of the presumed underwater turbidity, one of the plurality of pattern projectors as a pattern projector that irradiates the predetermined pattern.

13. An image processing method comprising:

causing an image sensor to capture an image of an underwater measurement target;

emitting first laser light underwater;

emitting second laser light underwater from a position that differs from the first laser light source; and generating, on a basis of first information acquired by causing the image sensor to capture images of the first laser light and the second laser light at a first water depth and second information acquired by causing the image sensor to capture images of the first laser light and the second laser light at a second water depth which is a water depth at which the image sensor captures an image of the measurement target, correction data used to correct distortion in a captured image captured by the image sensor at the second water depth.

14. A non-transitory memory storing a program that, when executed by a computer, causes the computer to:

emit first laser light underwater;

emit second laser light underwater from a position that differs from the first laser light source; and generate, on a basis of first information acquired by causing an image sensor to capture images of the first laser light and the second laser light at a first water depth and second information acquired by causing the image sensor to capture images of the first laser light and the second laser light at a second water depth which is a water depth at which the image sensor captures an image of a measurement target, correction data used to correct distortion in a captured image captured by the image sensor at the second water depth.

* * * * *